US012811331B2

(12) United States Patent
Li et al.

(10) Patent No.: US 12,811,331 B2
(45) Date of Patent: Nov. 24, 2026

(54) CONNECTOR UNIT AND CAP

(71) Applicant: Japan Aviation Electronics Industry, Limited, Tokyo (JP)

(72) Inventors: Teng Li, Tokyo (JP); Naoki Iwao, Tokyo (JP); Kazunobu Nakamura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 293 days.

(21) Appl. No.: 18/412,141

(22) Filed: Jan. 12, 2024

(65) Prior Publication Data

US 2024/0154348 A1 May 9, 2024

Related U.S. Application Data

(63) Continuation of application No. PCT/JP2022/017832, filed on Apr. 14, 2022.

(30) Foreign Application Priority Data

Aug. 3, 2021 (JP) ................................. 2021-127041
Aug. 3, 2021 (JP) ................................. 2021-127329

(51) Int. Cl.
*H01R 13/447* (2006.01)
*H01R 13/52* (2006.01)

(52) U.S. Cl.
CPC ....... *H01R 13/447* (2013.01); *H01R 13/5227* (2013.01)

(58) Field of Classification Search
CPC .............. H01R 13/447; H01R 13/5227; H01R 13/5213
See application file for complete search history.

(56) References Cited

U.S. PATENT DOCUMENTS 7,083,439 B1 * 8/2006 Hayakawa ........... H01R 13/443 439/136
7,125,284 B2 * 10/2006 Ripper ................. H01R 13/501 439/620.05

(Continued)

FOREIGN PATENT DOCUMENTS

CN 201584571 U 9/2010
CN 110518393 A 11/2019

(Continued)

*Primary Examiner* — Truc T Nguyen
(74) *Attorney, Agent, or Firm* — MUNCY, GEISSLER, OLDS & LOWE, P.C.

(57) ABSTRACT

A connector unit includes a cap that is attached to a connector housing and openably and closably covers an opening portion, the cap including an L-shaped arm made of an elastic material and having a support portion, a bent portion, and a hook portion, the cap being retained by the connector housing with the support portion being passed through a cap attachment hole of the connector housing, the support portion and the hook portion each have a thickness dimension smaller than a dimension of the cap attachment hole, a maximum dimension of the bent portion is larger than the dimension of the cap attachment hole, and the hook portion has a length dimension larger than the dimension of the cap attachment hole when viewed in a direction perpendicular to a plane including the support portion, the bent portion, and the hook portion.

11 Claims, 6 Drawing Sheets

(56) References Cited

U.S. PATENT DOCUMENTS

| | | | | |
|---|---|---|---|---|
| 8,913,374 | B2 * | 12/2014 | Wu | H05K 5/0217 361/679.01 |
| 11,637,397 | B2 * | 4/2023 | Lindkamp | H01R 13/44 439/271 |
| 2002/0119697 | A1 * | 8/2002 | Chan | H01R 13/5213 439/519 |
| 2009/0130875 | A1 * | 5/2009 | Guo | H01R 13/447 439/141 |
| 2009/0258516 | A1 * | 10/2009 | Hiew | H01R 13/44 439/136 |
| 2011/0051329 | A1 * | 3/2011 | Huang | G06F 1/1656 361/679.01 |
| 2012/0295460 | A1 | 11/2012 | Ichio et al. | |
| 2012/0295472 | A1 * | 11/2012 | Mcsweyn | H01R 31/06 439/501 |
| 2013/0095678 | A1 * | 4/2013 | Hara | B60L 53/18 439/136 |
| 2013/0337676 | A1 * | 12/2013 | Hsueh | H01R 13/6275 439/350 |
| 2014/0080334 | A1 * | 3/2014 | Tetsuya | H01R 13/5213 439/136 |
| 2022/0169189 | A1 * | 6/2022 | Lopez | H02G 3/083 |
| 2023/0124805 | A1 * | 4/2023 | Harmelink | H01R 13/447 439/352 |

FOREIGN PATENT DOCUMENTS

| | | | |
|---|---|---|---|
| JP | 10255900 | A | 9/1998 |
| JP | 2006066679 | A | 3/2006 |
| JP | 2006164857 | A | 6/2006 |
| JP | 4604694 | B2 | 1/2011 |
| JP | 2015115511 | A | 6/2015 |
| JP | 2020049970 | A | 4/2020 |

* cited by examiner

CONNECTOR UNIT AND CAP

CROSS REFERENCE TO RELATED APPLICATIONS

This application is a Continuation of co-pending Application No. PCT/JP2022/017832, filed on Apr. 14, 2022, for which priority is claimed under 35 U.S.C. § 120; and this application claims priority of Application No. 2021-127329 filed in Japan on Aug. 3, 2021 and Application No. 2021-127041 filed in Japan on Aug. 3, 2021, under 35 U.S.C. § 119, the entire contents of all of which are hereby incorporated by reference.

BACKGROUND OF THE INVENTION

The present invention relates to a connector unit, particularly to a connector unit in which an opening portion is openably and closably covered by a cap, the opening portion allowing a counter connector to be inserted therein in a fitting process.

The present invention also relates to a cap used in such a connector unit.

BACKGROUND ART

Conventionally, there has been known a structure in which, in an electronic device or the like including an external terminal connection port, the external terminal connection port is covered by a cap in order to prevent water, dust or the like from entering from the outside when an external terminal is not connected.

For instance, JP 2015-115511 A discloses a connector panel shown in FIG. 16. The connector panel includes a panel frame 1 and a cap 2 attached to the panel frame 1, and the panel frame 1 is provided with an external terminal connection port 3 and a cap accommodating portion 4 of recess shape communicating with the external terminal connection port 3.

The cap 2 includes a lid portion 5, an insertion portion 6 of rod shape extending from a bottom surface of the lid portion 5, and an extension portion 7 formed at a tip of the insertion portion 6 and formed to be larger in thickness than the insertion portion 6, and the extension portion 7 and the insertion portion 6 are passed through a hinge window 8 obliquely formed in the panel frame 1, whereby the cap 2 is movably attached to the panel frame 1.

A connection terminal (not shown) is mounted inside the external terminal connection port 3, and when an external terminal is not used, the lid portion 5 of the cap 2 is accommodated in the cap accommodating portion 4 of the panel frame 1, whereby the external terminal connection port 3 is covered.

In order to prevent the cap 2 from coming off the panel frame 1, the panel frame 1 is provided with a recessed portion 9 communicating with the hinge window 8, and an end of a support plate 10 is fitted in the recessed portion 9. The hinge window 8 is narrowed by the end of the support plate 10, so that the extension portion 7 of the cap 2 cannot be passed through and come out of the hinge window 8.

However, for the purpose of preventing the cap 2 from coming off the panel frame 1, it is necessary to fit the end of the support plate 10 into the recessed portion 9 formed in the panel frame 1, so that the structure of the connector panel becomes complicated, and the process for attaching the cap 2 to the panel frame 1 requires a lot of work.

SUMMARY OF THE INVENTION

The present invention has been made to overcome the conventional problem described above and aims at providing a connector unit in which an opening portion of a connector housing is openably and closably covered by a cap and which has a simple structure and is capable of easily attaching the cap to the connector housing.

The present invention also aims at providing a cap used in such a connector unit.

A connector unit according to the present invention comprises:

- a connector portion to be fitted with a counter connector;
- a connector housing retaining the connector portion and having an opening portion for inserting the counter connector in a fitting process with the counter connector; and
- a cap that is attached to the connector housing and openably and closably covers the opening portion,
- wherein the connector housing includes a front plate portion that is provided with the opening portion, and a cap attachment hole penetrating the front plate portion and communicating with an inside of the connector housing,
- the cap includes a lid portion having a back surface facing the front plate portion, and an L-shaped arm joined to the lid portion and made of an elastic material,
- the L-shaped arm includes a support portion projecting and extending in a direction intersecting the back surface of the lid portion, a bent portion formed at a tip of the support portion, and a hook portion extending from the bent portion in a direction intersecting the support portion,
- the cap is retained by the connector housing with the hook portion being accommodated inside the connector housing and the support portion being passed through the cap attachment hole, and
- when viewed in a direction perpendicular to a plane including the support portion, the bent portion, and the hook portion, the support portion and the hook portion each have a thickness dimension smaller than a dimension of the cap attachment hole, a maximum dimension of the bent portion is larger than the dimension of the cap attachment hole, and the hook portion has a length dimension larger than the dimension of the cap attachment hole.

A cap according to the present invention is one that is attached to a connector housing having a front plate portion that is provided with an opening portion for inserting a counter connector and a cap attachment hole by using the cap attachment hole and that openably and closably covers the opening portion, the cap comprising:

- a lid portion having a back surface facing the front plate portion of the connector housing; and
- an L-shaped arm joined to the lid portion and made of an elastic material,
- wherein the L-shaped arm includes a support portion projecting and extending in a direction intersecting the back surface of the lid portion, a bent portion formed at a tip of the support portion, and a hook portion extending from the bent portion in a direction intersecting the support portion, and
- the bent portion has a thin-wall part.

DETAILED DESCRIPTION OF THE INVENTION

An embodiment of the present invention is described below based on the accompanying drawings.

Figure 1:
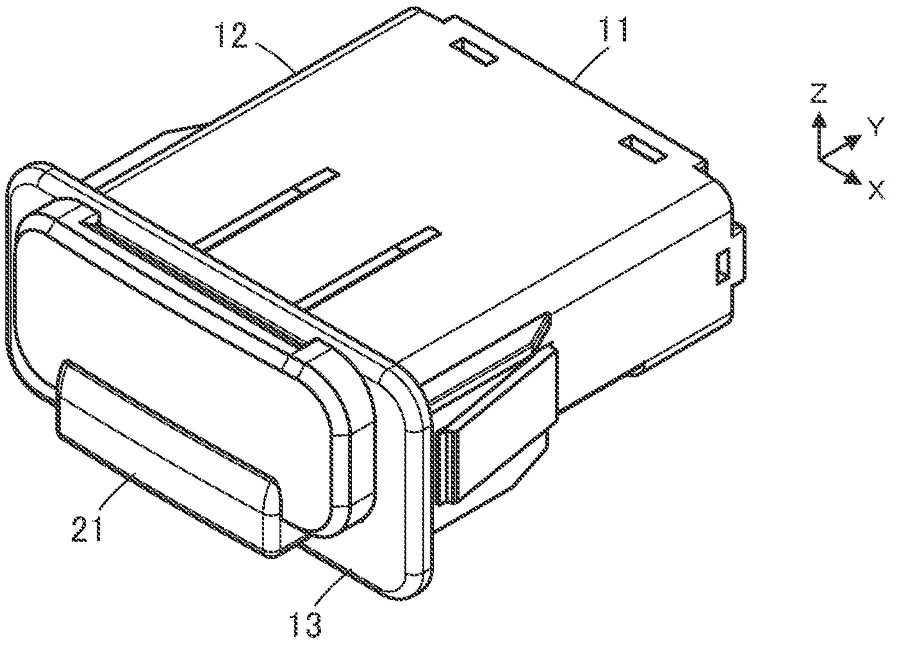
FIG. 1 is a perspective view showing a connector unit according to an embodiment of the present invention.
Figure 2:
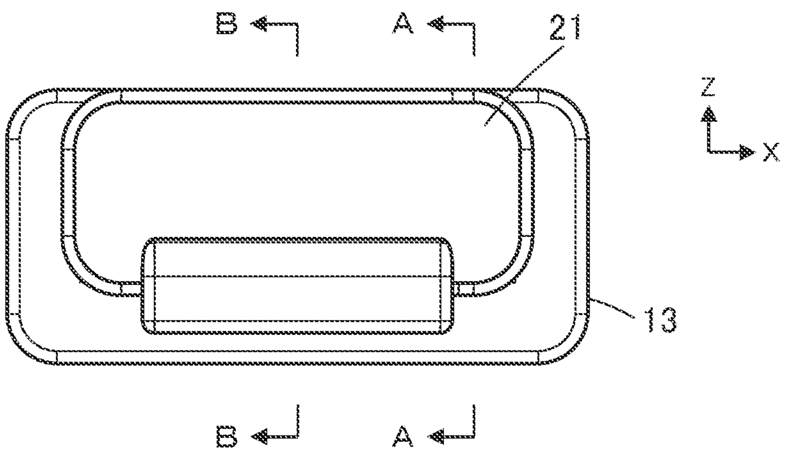
FIG. 2 is a front view showing the connector unit according to the embodiment.

FIGS. 1 and 2 are a perspective view and a front view, respectively, each showing a connector unit according to the embodiment. The connector unit includes a connector housing 11 made of an insulating material such as an insulating resin and a cap 21 attached to a front part of the connector housing 11 and made of an elastic material such as ethylene propylene diene rubber (EPDM).

The connector housing 11 includes a housing body portion 12 having a substantially cuboid shape and a front plate portion 13 of rectangular shape formed at a front end of the housing body portion 12, and the cap 21 is disposed so as to cover the front plate portion 13 of the connector housing 11.

For convenience, the direction in which the long side of the front plate portion 13 extends along a surface of the front plate portion 13 is called "X direction," the direction which is orthogonal to the X direction and extends from the front part of the connector housing 11, where the front plate portion 13 is provided, to a back part of the connector housing 11 is called "+Y direction," and the direction perpendicular to an XY plane is called "Z direction."

Figure 3:
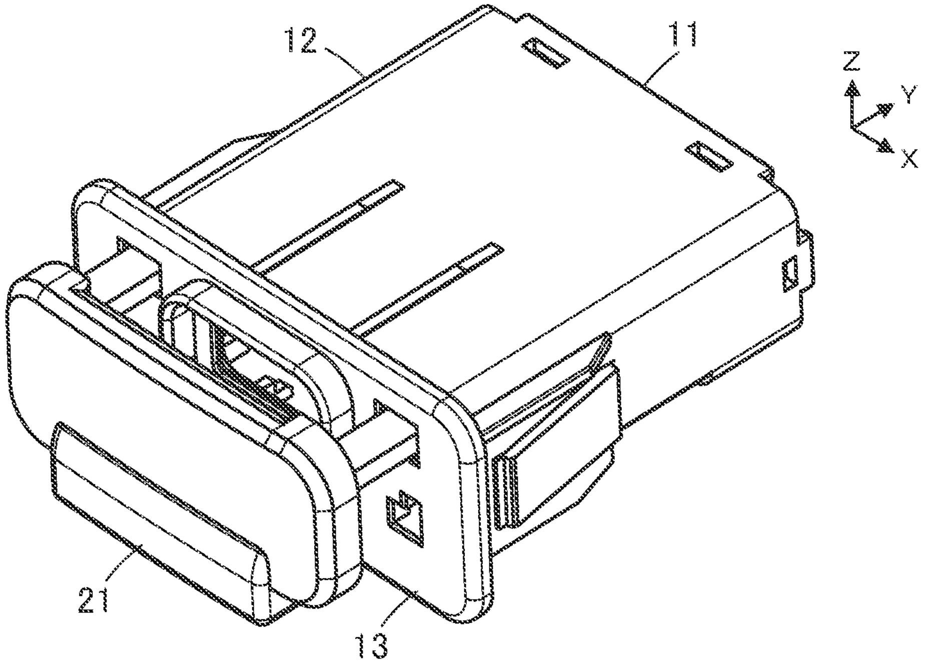
FIG. 3 is a perspective view showing the connector unit with a cap being drawn from a connector housing.

As shown in FIG. 3, the cap 21 is movably attached to the connector housing 11 and can be drawn in the −Y direction from the connector housing 11.

Figure 4:
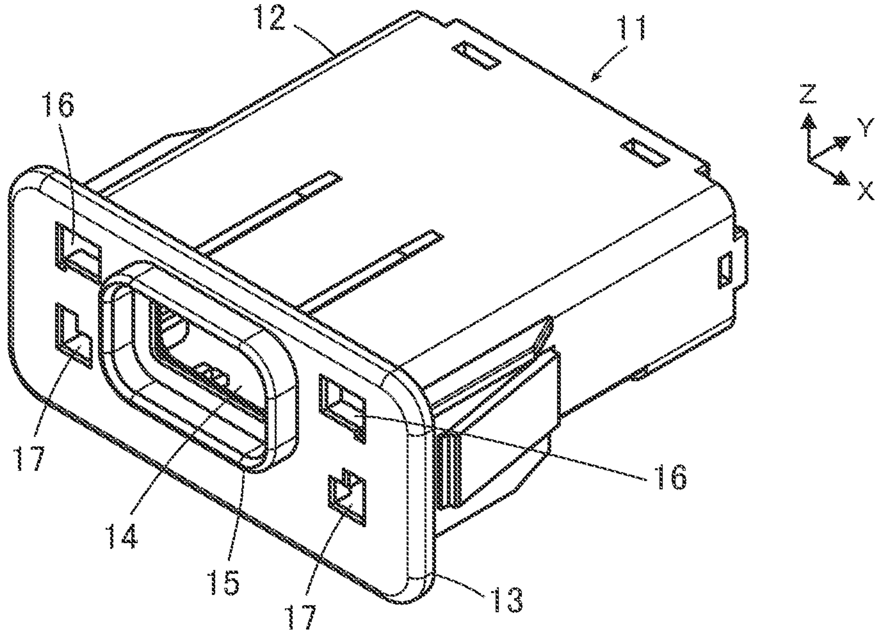
FIG. 4 is a perspective view showing the connector housing.

As shown in FIG. 4, the front plate portion 13 of the connector housing 11 is provided at a substantially central portion thereof with an opening portion 14 which is opened in the fitting direction of fitting with a counter connector (not shown) and in which the counter connector is inserted in a fitting process with the counter connector. As a counter connector, for example, a universal serial bus (USB) connector can be used, and the counter connector is inserted into the opening portion 14 of the front plate portion 13 from the −Y direction toward the +Y direction.

At a periphery of the opening portion 14, provided is a protrusion portion 15 extending in an XZ plane so as to form a substantially rectangular frame surrounding the opening portion 14 and protruding in the −Y direction.

In addition, on the +X direction side and the −X direction side of the opening portion 14, the front plate portion 13 is provided with a pair of cap attachment holes 16 penetrating the front plate portion 13.

Further, on the +X direction side and the −X direction side of the opening portion 14 and on the −Z direction side of the pair of cap attachment holes 16, the front plate portion 13 is provided with a pair of drain holes 17 penetrating the front plate portion 13.

Figure 5:
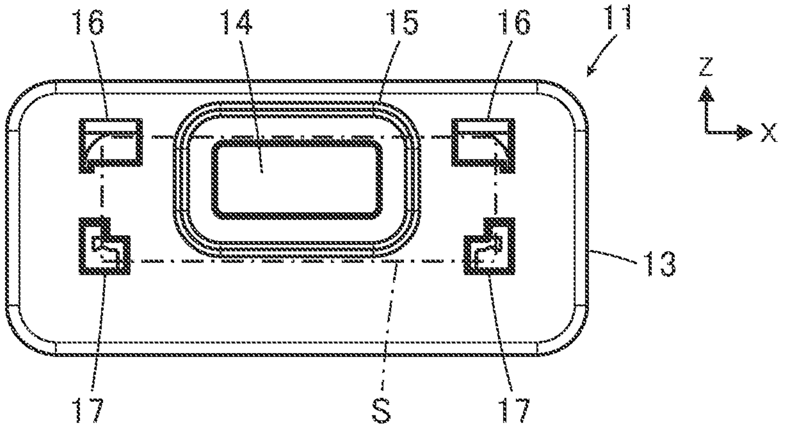
FIG. 5 is a front view showing the connector housing.

As shown in FIG. 5, the pair of cap attachment holes 16 and the pair of drain holes 17 are separately positioned at four vertexes of a rectangular S surrounding the opening portion 14 and having a pair of long sides extending in the X direction and a pair of short sides extending in the Z direction.

That is, the pair of cap attachment holes 16 are separately disposed in the front plate portion 13 at positions shifted in the +Z direction from the opening portion 14, while the pair of drain holes 17 are separately disposed in the front plate portion 13 at positions shifted in the −Z direction from the opening portion 14.

Specifically, the cap attachment hole 16, situated on the −X direction side, of the pair of cap attachment holes 16 and the drain hole 17, situated on the +X direction side, of the pair of drain holes 17 are separately positioned at two vertexes situated on one of two diagonal lines of the rectangular S, while the cap attachment hole 16, situated on the +X direction side, of the pair of cap attachment holes 16 and the drain hole 17, situated on the −X direction side, of the pair of drain holes 17 are separately positioned at two vertexes situated on the other of the two diagonal lines of the rectangular S.

Figure 6:
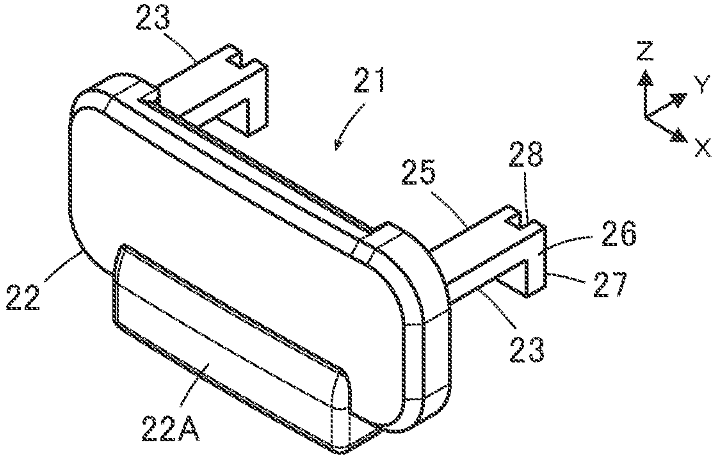
FIG. 6 is a perspective view showing the cap when viewed obliquely from the front.

As shown in FIG. 6, the cap 21 includes a lid portion 22 of rectangular and substantially flat plate shape extending along an XZ plane and a pair of L-shaped arms 23 joined to the lid portion 22 and extending in the +Y direction. The pair of L-shaped arms 23 correspond to the pair of cap attachment holes 16 formed in the front plate portion 13 of the connector housing 11. The −Z directional end of the lid portion 22 is provided with a handle portion 22A for moving the cap 21.

Figure 7:
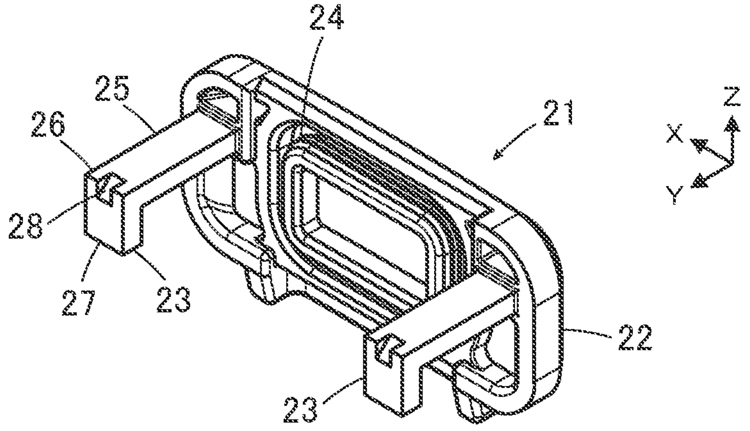
FIG. 7 is a perspective view showing the cap when viewed obliquely from the rear.

As shown in FIG. 7, at a substantially central portion of a back surface, facing in the +Y direction, of the lid portion 22, provided is a fitting groove 24 extending in an XZ plane so as to form a substantially rectangular frame and recessed in the −Y direction. This fitting groove 24 has a size corresponding to the protrusion portion 15 formed on the front plate portion 13 of the connector housing 11, and when the protrusion portion 15 of the connector housing 11 is fitted into the fitting groove 24 of the cap 21, the cap 21 is fixed to the front plate portion 13.

Each of the pair of L-shaped arms 23 includes a support portion 25 of rod shape projecting and extending in the +Y direction from a back surface of the lid portion 22 at a position shifted in the +Z direction in the back surface facing in the +Y direction, a bent portion 26 formed at the +Y directional end of the support portion 25, and a hook portion 27 of rod shape extending in the −Z direction from the bent portion 26.

The bent portion 26 is a connection portion between the support portion 25 and the hook portion 27 intersecting orthogonally to each other, and has a corner portion sharply pointed in the +Y direction and the +Z direction.

In addition, the bent portion 26 is provided with a cutout 28 disposed at a middle part of the bent portion 26 in the X direction and extending along a YZ plane, and due to the presence of this cutout 28, thin-wall parts are formed in the bent portion 26. While the cap 21 is made of an elastic material, the bent portion 26 has the thin-wall parts so as to be elastically deformed more easily.

Figure 8:
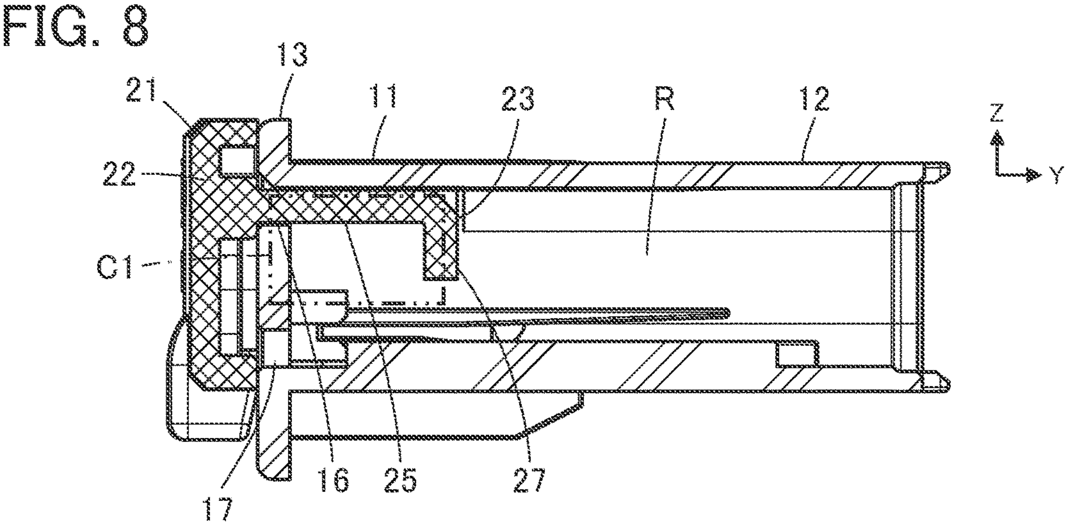
FIG. 8 is a cross-sectional view taken along line A-A in FIG. 2.

As shown in FIG. 8, the pair of cap attachment holes 16 and the pair of drain holes 17, which are formed in the front plate portion 13 of the connector housing 11, communicate with an inner space R of the housing body portion 12.

Each of the pair of L-shaped arms 23 of the cap 21 is passed through the corresponding cap attachment hole 16 of the connector housing 11, and the cap 21 is retained by the connector housing 11 with the hook portions 27 being accommodated in the inner space R of the housing body portion 12 and the support portions 25 being separately passed through the cap attachment holes 16.

A connector portion C1 to be fitted with a counter connector (not shown) and other components are incorporated in the inner space R of the housing body portion 12.

When a counter connector is not fitted with the connector portion C1, as shown in FIG. 8, the cap 21 is moved in the +Y direction with the support portions 25 being separately passed through the cap attachment holes 16 until the lid portion 22 makes contact with the front plate portion 13 of the connector housing 11.

Figure 9:
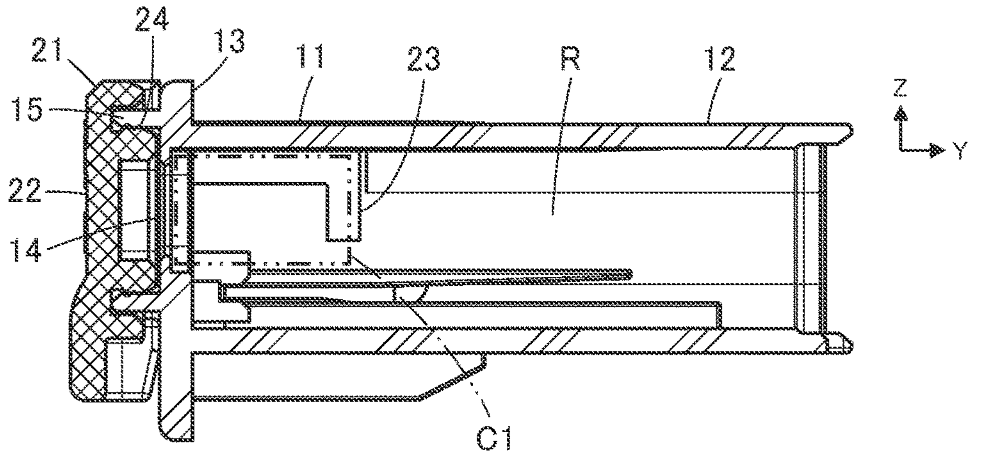
FIG. 9 is a cross-sectional view taken along line B-B in FIG. 2.

At this time, as shown in FIG. 9, the protrusion portion 15 formed in the front plate portion 13 of the connector housing 11 is fitted into the fitting groove 24 of the lid portion 22, whereby the cap 21 is fixed to the connector housing 11.

Figure 10:
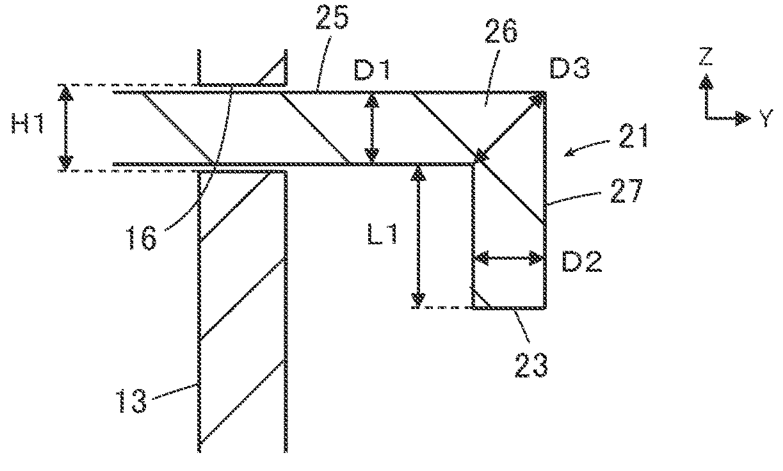
FIG. 10 is a cross-sectional view showing an L-shaped arm of the cap that has been passed through a cap attachment hole of a front plate portion.

As shown in FIG. 10, when viewed in the X direction perpendicular to a YZ plane including the support portion 25, the bent portion 26, and the hook portion 27 of the L-shaped arm 23 of the cap 21, the support portion 25 and the hook portion 27 respectively have thickness dimensions D1 and D2 smaller than a dimension H1 of the cap attachment hole 16 of the front plate portion 13.

Therefore, the support portion 25 and the hook portion 27 of the L-shaped arm 23 can be moved in the Y direction smoothly when these portions are passed through the cap attachment hole 16.

On the other hand, the bent portion 26 of the L-shaped arm 23 has a maximum dimension D3 larger than the dimension H1 of the cap attachment hole 16. The maximum dimension D3 of the bent portion 26 shown in FIG. 10 is represented by a distance from a connection portion between a −Z directional edge of the support portion 25 and a −Y directional edge of the hook portion 27 to the corner portion, sharply pointed in the +Y direction and the +Z direction, of the bent portion 26. In addition, a maximum value of a cross-sectional area when the bent portion 26 is cut by a cross section perpendicular to a YZ plane including the support portion 25, the bent portion 26, and the hook portion 27 is a value larger than the area of the cap attachment hole 16.

Therefore, when the bent portion 26 is once passed through the cap attachment hole 16 and accommodated in the inner space R of the housing body portion 12, the cap 21 does not easily come out of the cap attachment hole 16 even when a force to move the L-shaped arm 23 in the −Y direction with respect to the front plate portion 13 and pull out the L-shaped arm 23 from the cap attachment hole 16 acts on the cap 21.

Further, the hook portion 27 of the L-shaped arm 23 has a length dimension L1 larger than the dimension H1 of the cap attachment hole 16. Therefore, when the L-shaped arm 23 is moved in the −Y direction with respect to the front plate portion 13, the hook portion 27 makes contact with and is hooked by the back surface, facing in the +Y direction, of the front plate portion 13, whereby the L-shaped arm 23 cannot be easily pulled out from the cap attachment hole 16.

Figure 11:
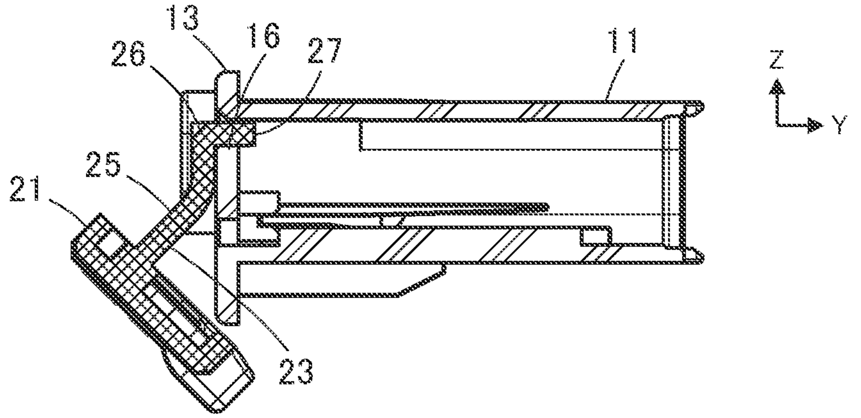
FIG. 11 is a cross-sectional view showing the connector unit when the cap is attached to the cap attachment hole of the front plate portion.

When the cap 21 is attached to the connector housing 11, as shown in FIG. 11, first, tips of the hook portions 27 of the pair of L-shaped arms 23 of the cap 21 are separately passed through and inserted into the pair of cap attachment holes 16 of the front plate portion 13 in the +Y direction. At this time, since the thickness dimension D2 of the hook portion 27 is smaller than the dimension H1 of the cap attachment hole 16, the hook portion 27 can be smoothly passed through the cap attachment hole 16.

When the hook portion 27 passed through the cap attachment hole 16 is moved in the +Y direction in this state, the bent portion 26 of the L-shaped arm 23 makes contact with the cap attachment hole 16. However, since the bent portion 26 has the maximum dimension D3 larger than the dimension H1 of the cap attachment hole 16, even when the L-shaped arm 23 is pushed in the +Y direction with this state being kept, the bent portion 26 cannot be inserted into the cap attachment hole 16.

Then, the bent portions 26 of the pair of L-shaped arms 23 are elastically deformed and squashed by an operator's finger or the like, the lid portion 22 of the cap 21 is moved in the +Y direction while being kept to be pulled up in the +Z direction, and each of the bent portions 26 of the pair of L-shaped arms 23 is inserted into the corresponding cap attachment hole 16. At this time, due to the presence of the cutouts 28 shown in FIGS. 6 and 7, the bent portions 26 are formed to be easily elastically deformed, so that the bent portions 26 can be easily squashed and inserted into the cap attachment holes 16.

When the bent portions 26 of the pair of L-shaped arms 23 are separately passed through the pair of cap attachment holes 16 in this manner, the support portions 25 of the pair of L-shaped arms 23 are then separately passed through the pair of cap attachment holes 16; since the thickness dimension D1 of each of the support portions 25 is smaller than the dimension H1 of each of the cap attachment holes 16, the support portions 25 can be passed through the cap attachment holes 16 and smoothly moved in the +Y direction.

Further, the pair of L-shaped arms 23 are moved in the +Y direction, and as shown in FIG. 9, the protrusion portion 15 of the front plate portion 13 is fitted into the fitting groove 24 of the lid portion 22, whereby the cap 21 is fixed to the connector housing 11.

Figure 12:
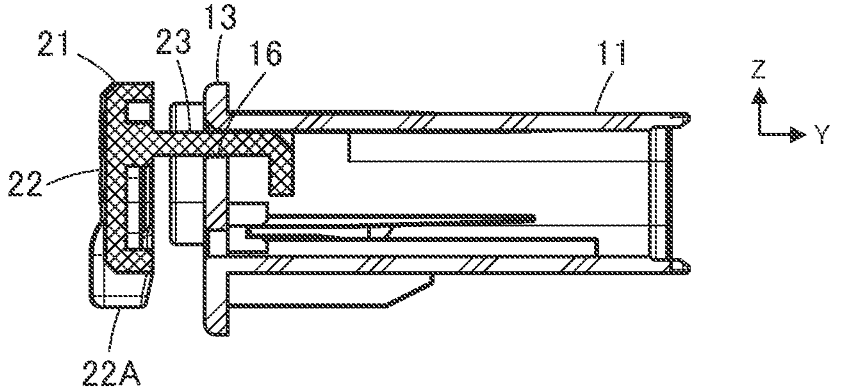
FIG. 12 is a cross-sectional view showing the connector unit when the cap is drawn from the connector housing.
Figure 13:
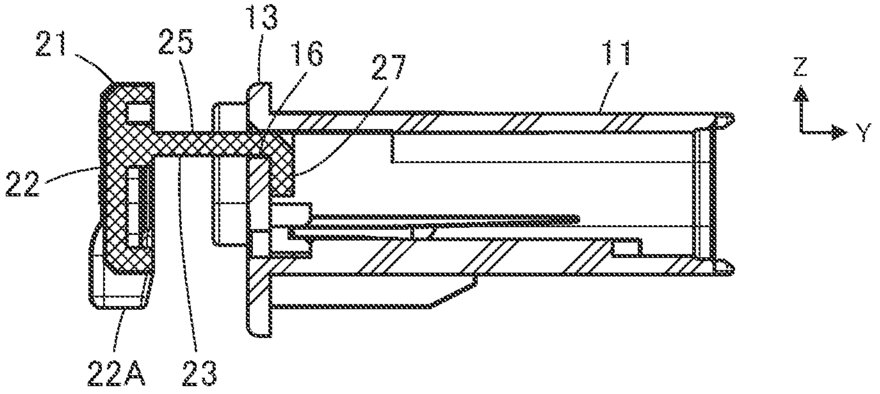
FIG. 13 is a cross-sectional view showing the connector unit with the cap being drawn from the connector housing.

Next, when a counter connector (not shown) is fitted with the connector portion C1, as shown in FIG. 12, the handle portion 22A of the lid portion 22 is moved in the −Y direction, whereby the cap 21 is drawn from the connector housing 11. When the handle portion 22A of the lid portion 22 is simply moved in the −Y direction, as shown in FIG. 13, the hook portions 27 of the pair of L-shaped arms 23 of the cap 21 make contact with and are hooked by the front plate portion 13 of the connector housing 11.

Figure 14:
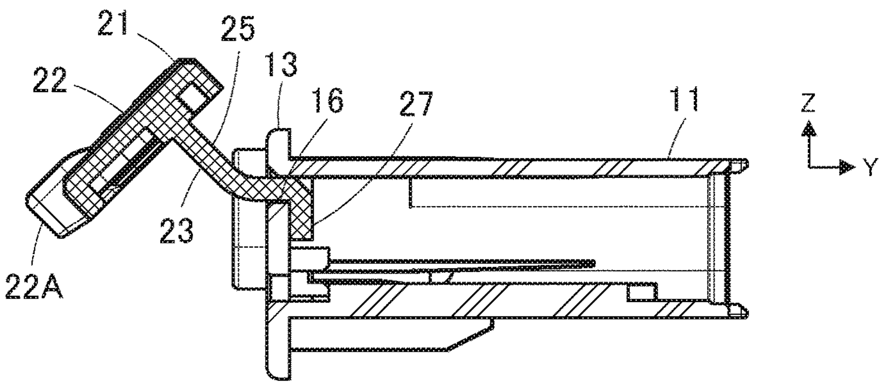
FIG. 14 is a cross-sectional view showing the connector unit when a lid portion of the cap drawn from the connector housing is opened.

Therefore, when the handle portion 22A of the lid portion 22 is pulled in the −Y direction in this state, the L-shaped arms 23 do not come out of the cap attachment holes 16, and since the handle portion 22A of the lid portion 22 is situated on the −Z direction side from the support portions 25 of the L-shaped arms 23, as shown in FIG. 14, the support portions 25 of the pair of L-shaped arms 23 are elastically deformed, and the lid portion 22 is inclined and pulled up in the +Z direction.

Figure 15:
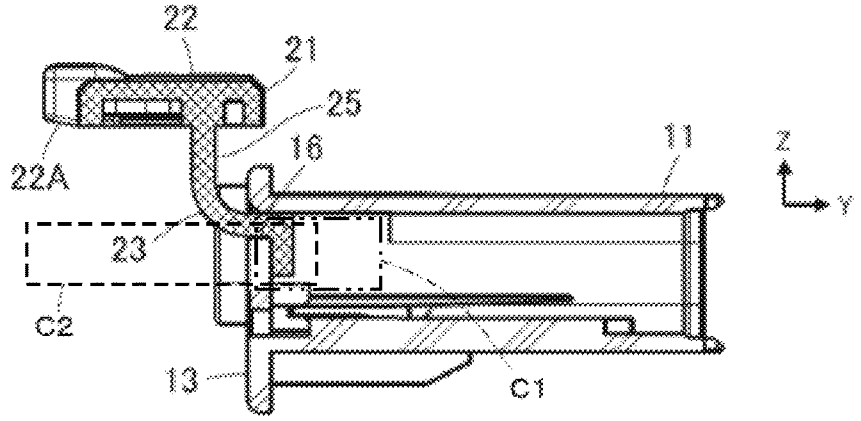
FIG. 15 is a cross-sectional view showing the connector unit with the lid portion of the cap being opened.
Figure 16:
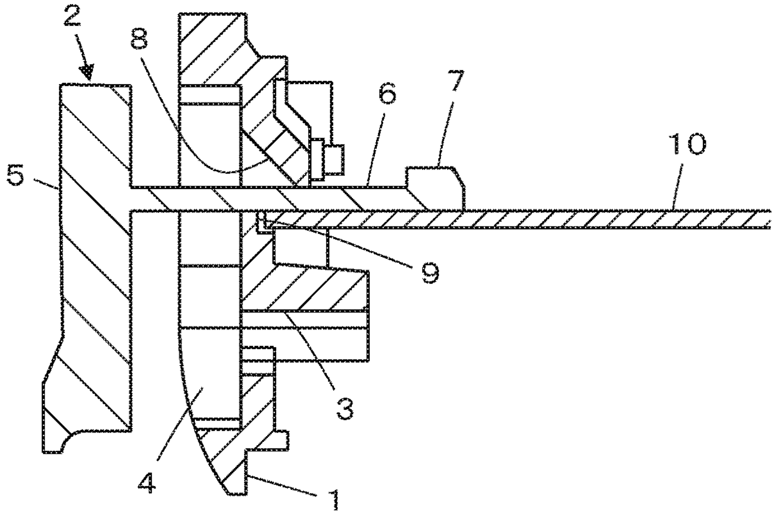
FIG. 16 PRIOR ART
FIG. 16 is a cross-sectional view showing a conventional connector panel.

Then, when the lid portion 22 of the cap 21 is pulled up to the +Z direction side from the front plate portion 13 of the connector housing 11 as shown in FIG. 15, the front plate portion 13 that has been covered by the lid portion 22 is exposed toward the −Y direction.

In this state, a counter connector C2 is passed through and inserted into the opening portion 14 of the front plate portion 13 from the −Y direction to the +Y direction to thereby be fitted with the connector portion C1.

As described above, in the connector unit according to the above embodiment, while it is a simple structure, the cap 21 can be easily attached to the connector housing 11 only by squashing the bent portions 26 of the pair of L-shaped arms 23 of the cap 21 and separately inserting the pair of L-shaped arms 23 into the pair of cap attachment holes 16 of the front plate portion 13. In addition, when the bent portions 26 of the pair of L-shaped arms 23 are once passed through the pair of cap attachment holes 16 and accommodated in the inner space R of the housing body portion 12, since the bent portions 26 of the pair of L-shaped arms 23 cannot be squashed from the outside of the connector housing 11, even when a withdrawal force is applied to the cap 21, the cap 21 can be prevented from coming off the connector housing 11.

When the connector unit configured as above is used out of doors, since the opening portion 14 is formed in the front plate portion 13 of the connector housing 11, water such as rainwater may sometimes enter the inner space R of the housing body portion 12 through the opening portion 14. However, since the pair of drain holes 17 are separately disposed at the positions shifted in the −Z direction from the opening portion 14 of the front plate portion 13, water that has entered the inner space R of the housing body portion 12 through the opening portion 14 is discharged to the outside of the connector housing 11 through the drain holes 17.

While the whole of the cap 21 including the lid portion 22 and the pair of L-shaped arms 23 is made of an elastic material in the embodiment as above, it suffices if at least only the pair of L-shaped arms 23 is made of an elastic material, and a material for forming the lid portion 22 is not particularly limited.

In addition, while the cap 21 has the pair of L-shaped arms 23 in the embodiment as above, the invention is not limited thereto, and even when the cap 21 has only one L-shaped arm 23, it is possible to achieve a connector unit that has a simple structure and is capable of easily attaching the cap 21 to the connector housing 11.

Further, while the thin-wall parts are formed in the bent portion 26 due to the presence of the cutout 28 in the L-shaped arm 23 of the cap 21 in the embodiment as above, the invention is not limited thereto, and even when, for example, a through-hole is formed in the bent portion 26, a thin-wall part can be formed, and the bent portion 26 can be elastically deformed more easily.

In addition, when the L-shaped arm 23 of the cap 21 includes the support portion 25 of rod shape and the hook portion 27 of rod shape in the embodiment as above, the invention is not limited thereto, and for example, the L-shaped arm 23 may include a support portion of flat plate shape and a hook portion of flat plate shape.

What is claimed is:

1. A connector unit comprising:

a connector portion to be fitted with a counter connector;

a connector housing retaining the connector portion and having an opening portion for inserting the counter connector in a fitting process with the counter connector; and a cap that is attached to the connector housing and openably and closably covers the opening portion, wherein the connector housing includes a front plate portion that is provided with the opening portion, and a cap attachment hole penetrating the front plate portion and communicating with an inside of the connector housing, the cap includes a lid portion having a back surface facing the front plate portion, and an L-shaped arm joined to the lid portion and made of an elastic material, the L-shaped arm includes a support portion projecting and extending in a direction intersecting the back surface of the lid portion, a bent portion formed at a tip of the support portion, and a hook portion extending from the bent portion in a direction intersecting the support portion, the cap is retained by the connector housing with the hook portion being accommodated inside the connector housing and the support portion being passed through the cap attachment hole, and when viewed in a direction perpendicular to a plane including the support portion, the bent portion, and the hook portion, the support portion and the hook portion each have a thickness dimension smaller than a dimension of the cap attachment hole, a maximum dimension of the bent portion is larger than the dimension of the cap attachment hole, and the hook portion has a length dimension larger than the dimension of the cap attachment hole;

wherein the bent portion of the cap has a thin-wall part.

2. The connector unit according to claim 1, wherein a maximum value of a cross-sectional area when the bent portion is cut by a cross section perpendicular to the plane including the support portion, the bent portion, and the hook portion is larger than an area of the cap attachment hole.

3. The connector unit according to claim 1, wherein the bent portion has a cutout.

4. The connector unit according to claim 3, wherein the cutout is disposed at a middle part of the bent portion in a direction perpendicular to the plane including the support portion, the bent portion, and the hook portion and extends in parallel to the plane.

5. The connector unit according to claim 1, wherein the cap has two L-shaped arms disposed in parallel to each other, the two L-shaped arms each being identical to the L-shaped arm, the L-shaped arm includes the support portion of rod shape and the hook portion of rod shape, and the front plate portion of the connector housing has two cap attachment holes corresponding to the two L-shaped arms, the two cap attachment holes each being identical to the cap attachment hole.

6. The connector unit according to claim 1, wherein the support portion of the cap is disposed in the back surface of the lid portion at a position shifted in an opposite direction from a direction in which the hook portion extends from the bent portion, and the cap attachment hole of the connector housing is disposed in the front plate portion at a position shifted from the opening portion in an opposite direction from the direction in which the hook portion extends from the bent portion.

7. The connector unit according to claim 6, wherein the connector housing has a drain hole that is disposed in the front plate portion at a position shifted from the cap attachment hole in the direction in which the hook portion extends from the bent portion, and that penetrates the front plate portion.

8. The connector unit according to claim 7, wherein the cap attachment hole and the drain hole are separately positioned in the front plate portion at two vertexes situated on a diagonal line of a rectangular surrounding the opening portion.

9. A cap that is attached to a connector housing having a front plate portion that is provided with an opening portion for inserting a counter connector and a cap attachment hole by using the cap attachment hole and that openably and closably covers the opening portion, the cap comprising:

a lid portion having a back surface facing the front plate portion of the connector housing; and an L-shaped arm joined to the lid portion and made of an elastic material, wherein the L-shaped arm includes a support portion projecting and extending in a direction intersecting the back surface of the lid portion, a bent portion formed at a tip of the support portion, and a hook portion extending from the bent portion in a direction intersecting the support portion, and the bent portion has a thin-wall part.

10. The cap according to claim 9, wherein the bent portion has a cutout.

11. The cap according to claim 10, wherein the cutout is disposed at a middle part of the bent portion in a direction perpendicular to a plane including the support portion, the bent portion, and the hook portion and extends in parallel to the plane.

* * * * *